US012644033B2

(12) United States Patent
Micali et al.

(10) Patent No.: US 12,644,033 B2
(45) Date of Patent: Jun. 2, 2026

(54) HEAT TRANSFER MIXTURE AND METHOD

(71) Applicant: HT MATERIALS SCIENCE (IP) LIMITED, Dublin (IR)

(72) Inventors: Francesco Micali, Lecce (IT); Arturo De Risi, Lecce (IT); Marco Milanese, Arnesano (IT)

(73) Assignee: HT Materials Science (IP) Limited, Dublin (IE)

(*) Notice: Subject to any disclaimer, the term of this patent is extended or adjusted under 35 U.S.C. 154(b) by 685 days.

(21) Appl. No.: 18/100,165

(22) Filed: Jan. 23, 2023

(65) Prior Publication Data

US 2024/0254378 A1 Aug. 1, 2024

(51) Int. Cl.

| | |
|---|---|
| ***C09K 5/10*** | (2006.01) |
| ***C09C 1/40*** | (2006.01) |
| ***C09C 3/00*** | (2006.01) |
| ***C09C 3/04*** | (2006.01) |
| ***C09C 3/10*** | (2006.01) |

(52) U.S. Cl.

CPC ................ *C09K 5/10* (2013.01); *C09C 1/407* (2013.01); *C09C 3/006* (2013.01); *C09C 3/041* (2013.01); *C09C 3/10* (2013.01); *C01P 2004/62* (2013.01); *C01P 2006/32* (2013.01)

(58) Field of Classification Search

CPC ........... C09K 5/10; C09C 1/407; C09C 3/006; C09C 3/041; C09C 3/10; C01P 2004/62; C01P 2006/32

See application file for complete search history.

(56) References Cited

U.S. PATENT DOCUMENTS

| | | | | |
|---|---|---|---|---|
| 5,338,477 A * | 8/1994 | Chen | C02F 5/14 | 510/253 |
| 7,744,775 B2 * | 6/2010 | Yang | C23F 11/10 | 252/75 |
| 2004/0069454 A1 * | 4/2004 | Bonsignore | C09K 5/10 | 165/104.16 |
| 2008/0302998 A1 * | 12/2008 | Hong | C09K 5/10 | 977/750 |
| 2013/0062555 A1 * | 3/2013 | Olson | C09K 5/10 | 252/75 |
| 2021/0222041 A1 * | 7/2021 | De Risi | C09K 5/10 | |

* cited by examiner

*Primary Examiner* — Andrew J. Oyer
(74) *Attorney, Agent, or Firm* — Sorell, Lenna & Schmidt, LLP

(57) ABSTRACT

A method of forming a heat transfer fluid includes dispersing an aluminum oxide powder in water to form a slurry; combining the slurry with water to form a first combination; adding a first amount of a chelating agent to the first combination to form a second combination; adding a first amount of a surfactant to the second combination to form a third combination; adding one of the group consisting of propylene glycol and ethylene glycol to the third combination to form a fourth combination; adding a second amount of the chelating agent to the fourth combination to form a fifth combination; adding a second amount of the surfactant to the fifth combination to form a sixth combination; and mixing the sixth combination to form the heat transfer fluid.

34 Claims, 8 Drawing Sheets

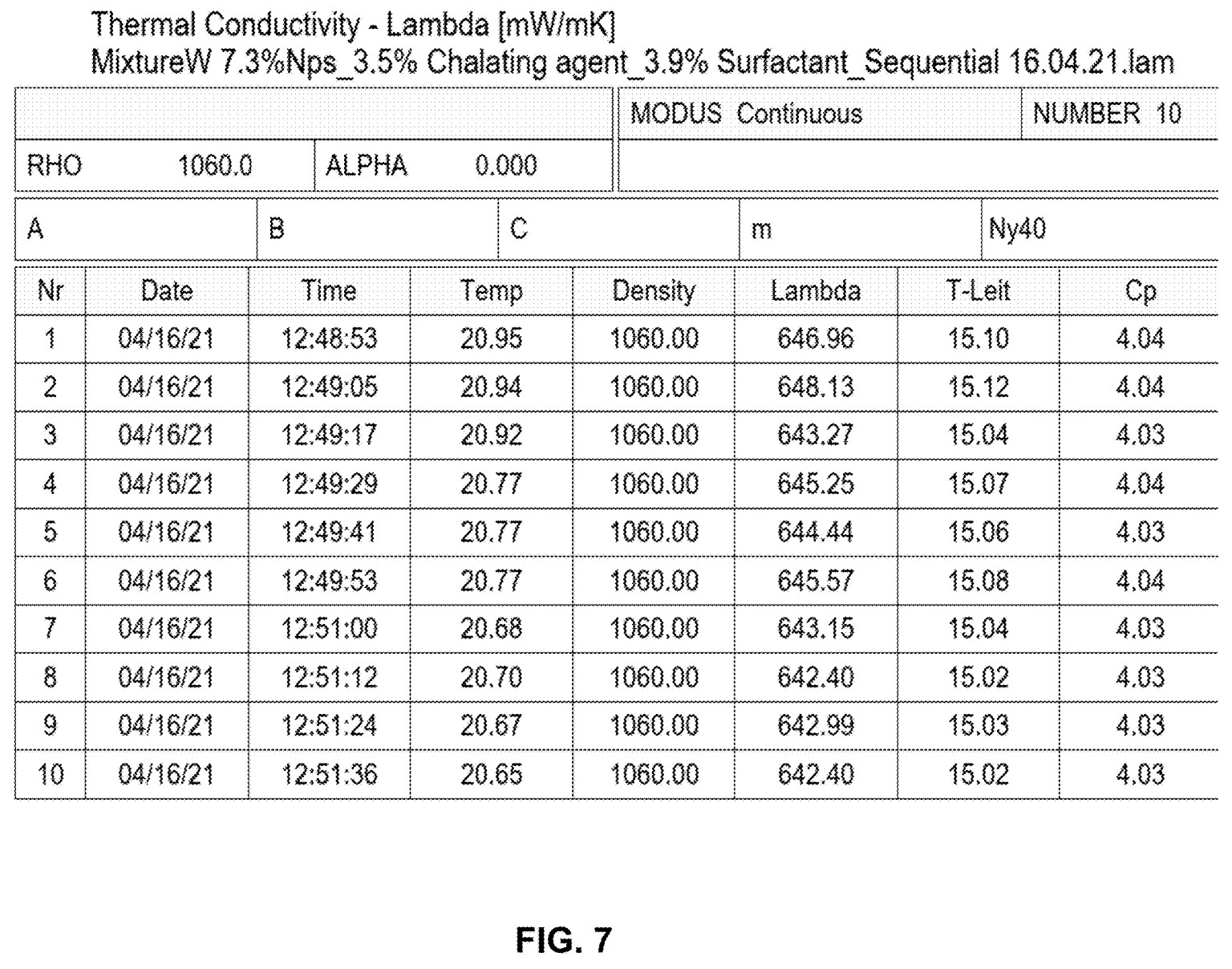

Thermal Conductivity - Lambda [mW/mK]
MixtureW 7.3%Nps_3.5% Chalating agent_3.9% Surfactant_Sequential 16.04.21.lam

| | | | |
|---|---|---|---|
| | | MODUS Continuous | NUMBER 10 |
| RHO 1060.0 | ALPHA 0.000 | | |

| A | B | C | m | Ny40 |
|---|---|---|---|---|

| Nr | Date | Time | Temp | Density | Lambda | T-Leit | Cp |
|---|---|---|---|---|---|---|---|
| 1 | 04/16/21 | 12:48:53 | 20.95 | 1060.00 | 646.96 | 15.10 | 4.04 |
| 2 | 04/16/21 | 12:49:05 | 20.94 | 1060.00 | 648.13 | 15.12 | 4.04 |
| 3 | 04/16/21 | 12:49:17 | 20.92 | 1060.00 | 643.27 | 15.04 | 4.03 |
| 4 | 04/16/21 | 12:49:29 | 20.77 | 1060.00 | 645.25 | 15.07 | 4.04 |
| 5 | 04/16/21 | 12:49:41 | 20.77 | 1060.00 | 644.44 | 15.06 | 4.03 |
| 6 | 04/16/21 | 12:49:53 | 20.77 | 1060.00 | 645.57 | 15.08 | 4.04 |
| 7 | 04/16/21 | 12:51:00 | 20.68 | 1060.00 | 643.15 | 15.04 | 4.03 |
| 8 | 04/16/21 | 12:51:12 | 20.70 | 1060.00 | 642.40 | 15.02 | 4.03 |
| 9 | 04/16/21 | 12:51:24 | 20.67 | 1060.00 | 642.99 | 15.03 | 4.03 |
| 10 | 04/16/21 | 12:51:36 | 20.65 | 1060.00 | 642.40 | 15.02 | 4.03 |

FIG. 7

Thermal Conductivity - Lambda [mW/mK]
MixtureW 7.3%Nps 3.5% Chalating agent 3.9% Surfactant 1 step 10.12.21.lam

| | | | |
|---|---|---|---|
| | | MODUS Continuous | NUMBER 10 |
| RHO 1060.0 | ALPHA 0.000 | | |

| | | | | |
|---|---|---|---|---|
| A | B | C | m | Ny40 |

| Nr | Date | Time | Temp | Density | Lambda | T-Leit | Cp |
|---|---|---|---|---|---|---|---|
| 1 | 12/10/21 | 16:47:31 | 20.24 | 1060.00 | 636.34 | 14.92 | 4.02 |
| 2 | 12/10/21 | 16:47:43 | 20.24 | 1060.00 | 636.14 | 14.92 | 4.02 |
| 3 | 12/10/21 | 16:47:55 | 20.22 | 1060.00 | 636.19 | 14.92 | 4.02 |
| 4 | 12/10/21 | 16:48:07 | 20.22 | 1060.00 | 636.12 | 14.92 | 4.02 |
| 5 | 12/10/21 | 16:48:19 | 20.24 | 1060.00 | 636.32 | 14.92 | 4.02 |
| 6 | 12/10/21 | 16:48:31 | 20.22 | 1060.00 | 636.11 | 14.92 | 4.02 |
| 7 | 12/10/21 | 16:48:43 | 20.22 | 1060.00 | 636.05 | 14.92 | 4.02 |
| 8 | 12/10/21 | 16:48:55 | 20.24 | 1060.00 | 635.85 | 14.92 | 4.02 |
| 9 | 12/10/21 | 16:49:07 | 20.22 | 1060.00 | 635.83 | 14.92 | 4.02 |
| 10 | 12/10/21 | 16:49:20 | 20.22 | 1060.00 | 635.62 | 14.91 | 4.02 |

FIG. 8

HEAT TRANSFER MIXTURE AND METHOD

CROSS-REFERENCE TO RELATED APPLICATIONS

This application is a continuation-in-part of and claims priority to co-pending U.S. patent application Ser. No. 17/205,018, filed Mar. 18, 2021 and co-pending U.S. patent application Ser. No. 17/205,029, filed Mar. 18, 2021; U.S. patent application Ser. No. 17/205,018 is a continuation-in-part of and claims priority to co-pending U.S. patent application Ser. No. 16/905,466, filed Jun. 18, 2020; U.S. patent application Ser. No. 16/905,466 is a continuation of and claims priority to U.S. patent application Ser. No. 16/577,292, filed on Sep. 20, 2019, now U.S. Pat. No. 10,723,927; U.S. patent application Ser. No. 17/205,029 is a continuation-in-part of and claims priority to co-pending U.S. patent application Ser. No. 16/905,471, filed Jun. 18, 2020; U.S. patent application Ser. No. 16/905,471 is a continuation of and claims priority to U.S. patent application Ser. No. 16/577,306, filed on Sep. 20, 2019, now U.S. Pat. No. 10,723,306. These applications are expressly incorporated herein by reference, in their entireties.

TECHNICAL FIELD

The present disclosure relates, in general, to refrigerants, and more particularly, to nanofluids or heat transfer mixtures that include aluminum oxide nanoparticles for use in thermal systems.

BACKGROUND

For well over a century, micro-sized particles with high thermal conductivity have been used to increase the thermal characteristics of working fluids. However, micro-sized particles can be abrasive and can precipitate out due to their higher density. More recently, nano-sized particles were introduced into a base liquid to constitute a nanofluid. In particular, copper, aluminum, or carbon based nanoparticles were used to create colloidal suspension fluids with enhanced thermal characteristics.

Conventional nanofluids have shown varying degrees of improvement in thermal performance with the addition of the nanoparticles to the thermal fluid. Many conventional nanofluids use copper (II) oxide (CuO) nanoparticles to form the nanofluid due to the favorable thermal properties of copper (II) oxide powders. However, nanofluids formed with copper (II) oxide suffer from several drawbacks that can impede their commercial use in a thermal system. For example, fluids containing copper (II) oxide nanoparticles have a tendency to mix with and retain air and oxygen within the fluid, which adversely affects the thermal properties of the fluid and can create problems in the thermal system. Additionally, the copper (II) oxide nanoparticles tend to agglomerate and/or stick to the container of the fluid in the thermal system, which can lead to impairment and fouling of the flow of fluid in the system. Furthermore, the blackish color of the nanofluids available on the market is less desirable than the lighter colored fluid of the present application.

As such, a need currently exists for a commercially viable nanofluid that has effective thermal properties, is relatively stable during use, and can be easily mass produced. This disclosure describes an improvement over these prior art technologies.

SUMMARY

In one embodiment, in accordance with the principles of the present disclosure, a method of forming a heat transfer fluid comprises: dispersing an aluminum oxide powder in water to form a slurry; combining the slurry with water to form a first combination; adding a first amount of a chelating agent to the first combination to form a second combination; adding a first amount of a surfactant to the second combination to form a third combination; adding one of the group consisting of propylene glycol and ethylene glycol to the third combination to form a fourth combination; adding a second amount of the chelating agent to the fourth combination to form a fifth combination; adding a second amount of the surfactant to the fifth combination to form a sixth combination; and mixing the sixth combination to form the heat transfer fluid.

In some embodiments, the chelating agent comprises a sodium salt solution of polyamino-polyether-methylene-phosphonic acid. In some embodiments, the surfactant comprises ammonium salt polyacrylate. In some embodiments, the chelating agent comprises a sodium salt solution of polyamino-polyether-methylene-phosphonic acid and the surfactant comprises ammonium salt polyacrylate. In some embodiments, the first amount of the chelating agent is greater than the second amount of the chelating agent. In some embodiments, the first amount of the surfactant is greater than the second amount of the surfactant. In some embodiments, the first amount of the chelating agent is greater than the second amount of the chelating agent and the first amount of the surfactant is greater than the second amount of the surfactant. In some embodiments, the first amount of the chelating agent is about 1.5 times to about 2.5 times greater than the second amount of the chelating agent. In some embodiments, the first amount of the surfactant is about 1.5 times to about 2.5 times greater than the second amount of the surfactant. In some embodiments, the first amount of the chelating agent is about 1.5 times to about 2.5 times greater than the second amount of the chelating agent and the first amount of the surfactant is about 1.5 times to about 2.5 times greater than the second amount of the surfactant. In some embodiments, the first amount of the chelating agent is 2 times greater than the second amount of the chelating agent. In some embodiments, the first amount of the surfactant is 2 times greater than the second amount of the surfactant. In some embodiments, the first amount of the chelating agent is 2 times greater than the second amount of the chelating agent and the first amount of the surfactant is 2 times greater than the second amount of the surfactant. In some embodiments, the method further comprises milling the fourth combination. In some embodiments, the method further comprises wet milling the sixth combination before mixing the sixth combination. In some embodiments, the aluminum oxide powder comprises a particle size between about 100 nanometers and about 600 nanometers. In some embodiments, the heat transfer mixture comprises between about 1% by volume and about 20% by volume of the aluminum oxide powder. In some embodiments, the heat transfer mixture comprises between about 0.1% by volume and about 3% by volume of the chelating agent. In some embodiments, the heat transfer mixture comprises between about 0.1% by volume and about 3% by volume of the surfactant. In some embodiments, the heat transfer mixture has a pH greater than 8.5.

In one embodiment, in accordance with the principles of the present disclosure, a method of forming a heat transfer fluid comprises: dispersing an aluminum oxide powder in water to form a slurry; combining the slurry with water to form a first combination; adding a first amount of a chelating agent to the first combination to form a second combination; adding a first amount of a surfactant to the second combination to form a third combination; adding one of the group selected from propylene glycol and ethylene glycol to the third combination to form a fourth combination; adding a second amount of the chelating agent to the fourth combination to form a fifth combination; adding a second amount of the surfactant to the fifth combination to form a sixth combination; and mixing the sixth combination to form the heat transfer fluid. The chelating agent comprises a sodium salt solution of polyamino-polyether-methylene-phosphonic acid and the surfactant comprises ammonium salt polyacrylate.

In some embodiments, the first amount of the chelating agent is greater than the second amount of the chelating agent. In some embodiments, the first amount of the surfactant is greater than the second amount of the surfactant. In some embodiments, the first amount of the chelating agent is greater than the second amount of the chelating agent and the first amount of the surfactant is greater than the second amount of the surfactant. In some embodiments, the first amount of the chelating agent is about 1.5 times to about 2.5 times greater than the second amount of the chelating agent. In some embodiments, the first amount of the surfactant is about 1.5 times to about 2.5 times greater than the second amount of the surfactant. In some embodiments, the first amount of the chelating agent is about 1.5 times to about 2.5 times greater than the second amount of the chelating agent and the first amount of the surfactant is about 1.5 times to about 2.5 times greater than the second amount of the surfactant. In some embodiments, the first amount of the chelating agent is 2 times greater than the second amount of the chelating agent. In some embodiments, the first amount of the surfactant is 2 times greater than the second amount of the surfactant. In some embodiments, the first amount of the chelating agent is 2 times greater than the second amount of the chelating agent and the first amount of the surfactant is 2 times greater than the second amount of the surfactant. In some embodiments, the method further comprise milling the fourth combination. In some embodiments, the method further comprises wet milling the sixth combination before mixing the sixth combination. In some embodiments, the aluminum oxide powder comprises a particle size between about 100 nanometers and about 600 nanometers. In some embodiments, the heat transfer mixture comprises between about 1% by volume and about 20% by volume of the aluminum oxide powder. In some embodiments, the heat transfer mixture comprises between about 0.1% by volume and about 3% by volume of the chelating agent. In some embodiments, the heat transfer mixture comprises between about 0.1% by volume and about 3% by volume of the surfactant. In some embodiments, the heat transfer mixture has a pH greater than 8.5.

In one embodiment, in accordance with the principles of the present disclosure, a method of forming a heat transfer fluid comprises dispersing an aluminum oxide powder in water to form a slurry; combining the slurry with water to form a first combination; adding a first amount of a chelating agent to the first combination to form a second combination; adding a first amount of a surfactant to the second combination to form a third combination; adding one of the group selected from propylene glycol and ethylene glycol to the third combination to form a fourth combination; milling the fourth combination for about 45 minutes; adding a second amount of the chelating agent to the fourth combination after milling the fourth combination to form a fifth combination; adding a second amount of the surfactant to the fifth combination to form a sixth combination; wet milling the sixth combination; and mixing the sixth combination for about 30 minutes to form the heat transfer fluid after wet milling the sixth combination. The chelating agent comprises a sodium salt solution of polyamino-polyether-methylene-phosphonic acid and the surfactant comprises ammonium salt polyacrylate. The first amount of the chelating agent is 2 times greater than the second amount of the chelating agent. The first amount of the surfactant is 2 times greater than the second amount of the surfactant. The aluminum oxide powder comprises a particle size between about 100 nanometers and about 600 nanometers. The heat transfer mixture comprises between about 1% by volume and about 20% by volume of the aluminum oxide powder. The heat transfer mixture comprises between about 0.1% by volume and about 3% by volume of the chelating agent. The heat transfer mixture comprises between about 0.1% by volume and about 3% by volume of the surfactant. The heat transfer mixture has a pH greater than 8.5. The heat transfer mixture is free of carbon nanoparticles.

In one embodiment, in accordance with the principles of the present disclosure, a heat transfer mixture is represented by the formula: $1=Vpg/Vnf+Vw/Vnf+Vpw/Vnf+Vca/Vnf+Vsf/Vnf+Vbs/Vnf+Vac/Vnf+Vci/Vnf$. Vnf is a volume of a nanofluid. Vpg is a volume of propylene glycol. Vw is a volume of water. Vpw is a volume of a nanopowder. Vca is a volume of a chelating agent. Vsf is a volume of a surfactant. Vbs is a volume of a base additive. Vac is a volume of an acid additive. Vci is a volume of a corrosive inhibitor. In some embodiments, the nanofluid and/or heat transfer mixture is free of carbon nanoparticles.

In one embodiment, in accordance with the principles of the present disclosure, a heat transfer mixture comprises or consists of propylene glycol, water, a nanopowder comprising $Al_2O_3$, a chelating agent, a surfactant, a base additive, an acid additive and a corrosive inhibitor. The nanopowder has a particle size between about 100 nanometers and about 600 nanometers. The heat transfer mixture comprises between about 1% by volume and about 20% by volume of the nanopowder. The heat transfer mixture comprises between about 0.1% by volume and about 3% by volume of the chelating agent. The heat transfer mixture comprises between about 0.1% by volume and about 3% by volume of the surfactant. The heat transfer mixture has a pH is between about 8.5.to about 12. In some embodiments, the heat transfer mixture is free of carbon nanoparticles.

In one embodiment, in accordance with the principles of the present disclosure, a heat transfer mixture comprises or consists of between about 30% by volume and up to about 70% by volume of propylene glycol, between about 30% by volume and about 70% by volume of water, between about 1.0% by volume and about 20% by volume of a nanopowder comprising $Al_2O_3$, between about 0.1% by volume and about 3% by volume of a chelating agent, between about 0.1% by volume and about 3% by volume of a surfactant, between about 1.0% by volume and about 10% by volume of a base additive, between about 1.0% by volume and about 10% by volume of an acid additive and between about 0.001% by volume and about 1.0% by volume of a corrosive inhibitor. The nanopowder has a particle size between about 100 nanometers and about 600 nanometers. The heat transfer mixture has a pH of about 10.0. In some embodiments, the heat transfer mixture is free of carbon nanoparticles.

In one embodiment, in accordance with the principles of the present disclosure, a heat transfer mixture is represented by the formula: 1=Vpg/Vnf+Vw/Vnf+Vpw/Vnf+Vca/Vnf+Vsf/Vnf+Vbs/Vnf. Vnf is a volume of a nanofluid. Vpg is a volume of propylene glycol. Vw is a volume of water. Vpw is a volume of a nanopowder. Vca is a volume of a chelating agent, Vsf is a volume of a surfactant. Vbs is a volume of a base additive. In some embodiments, the nanofluid and/or heat transfer mixture is free of carbon nanoparticles.

In one embodiment, in accordance with the principles of the present disclosure, a heat transfer mixture comprises or consists of propylene glycol, water, a nanopowder comprising $Al_2O_3$, a chelating agent, a surfactant, and a base additive. The nanopowder has a particle size between about 100 nanometers and about 600 nanometers. The heat transfer mixture comprises between about 1% by volume and about 20% by volume of the nanopowder. The heat transfer mixture comprises between about 1% by volume and about 3% by volume of the chelating agent. The heat transfer mixture comprises between about 1% by volume and about 3% by volume of the surfactant. The heat transfer mixture has a pH greater than 8.5. In some embodiments, the heat transfer mixture is free of carbon nanoparticles.

In one embodiment, in accordance with the principles of the present disclosure, a heat transfer mixture comprises or consists of between about 25% by volume and about 50% by volume of propylene glycol, between about 30% by volume and about 70% by volume of water, between about 1.0% by volume and about 20% by volume of a nanopowder comprising $Al_2O_3$, between about 0.1% by volume and about 3% by volume of a chelating agent, between about 0.1% by volume and about 3% by volume of a surfactant and between about 1.0% by volume and about 10% by volume of a base additive. The nanopowder has a particle size between about 100 nanometers and about 600 nanometers. The heat transfer mixture has a pH of about 10.0. In some embodiments, the heat transfer mixture is free of carbon nanoparticles.

In one embodiment, in accordance with the principles of the present disclosure, a heat transfer mixture is represented by the formula: 1=Veg/Vnf+Vw/Vnf+Vpw/Vnf+Vca/Vnf+Vsf/Vnf+Vbs/Vnf+Vac/Vnf+Vci/Vnf. Vnf is a volume of a nanofluid. Veg is a volume of ethylene glycol. Vw is a volume of water. Vpw is a volume of a nanopowder. Vca is a volume of a chelating agent. Vsf is a volume of a surfactant. Vbs is a volume of a base additive. Vac is a volume of an acid additive. Vci is a volume of a corrosive inhibitor. In some embodiments, the nanofluid and/or heat transfer mixture is free of carbon nanoparticles.

In one embodiment, in accordance with the principles of the present disclosure, a heat transfer mixture comprises or consists of ethylene glycol, water, a nanopowder comprising $Al_2O_3$, a chelating agent, a surfactant, a base additive, an acid additive and a corrosive inhibitor. The nanopowder has a particle size between about 100 nanometers and about 600 nanometers. The heat transfer mixture comprises between about 10% by volume and about 20% by volume of the nanopowder. The heat transfer mixture comprises between about 0.1% by volume and about 3% by volume of the chelating agent. The heat transfer mixture comprises between about 0.1% by volume and about 3% by volume of the surfactant. The heat transfer mixture has a pH greater than 8.5. In some embodiments, the heat transfer mixture is free of carbon nanoparticles.

In one embodiment, in accordance with the principles of the present disclosure, a heat transfer mixture comprises or consists of between about 25% by volume and about 50% by volume of ethylene glycol, between about 30% by volume and about 70% by volume of water, between about 1.0% by volume and about 20% by volume of a nanopowder comprising $Al_2O_3$, between about 0.1% by volume and about 3% by volume of a chelating agent, between about 0.1% by volume and about 3% by volume of a surfactant, between about 0% by volume and about 10% by volume of a base additive, between about 1% by volume and about 10% by volume of an acid additive and between about 0.001% by volume and about 1.0% by volume of a corrosive inhibitor. The nanopowder has a particle size between about 100 nanometers and about 600 nanometers. The heat transfer mixture has a pH of about 10.0. In some embodiments, the heat transfer mixture is free of carbon nanoparticles.

In one embodiment, in accordance with the principles of the present disclosure, a heat transfer mixture is represented by the formula: 1=Veg/Vnf+Vw/Vnf+Vpw/Vnf+Vca/Vnf+Vsf/Vnf+Vac/Vnf. Vnf is a volume of a nanofluid. Veg is a volume of ethylene glycol. Vw is a volume of water. Vpw is a volume of a nanopowder. Vca is a volume of a chelating agent. Vsf is a volume of a surfactant. Vac is a volume of an acid additive. In some embodiments, the nanofluid and/or heat transfer mixture is free of carbon nanoparticles.

In one embodiment, in accordance with the principles of the present disclosure, a heat transfer mixture comprises or consists of ethylene glycol, water, a nanopowder comprising $Al_2O_3$, a chelating agent, a surfactant and an acid additive. The nanopowder has a particle size between about 100 nanometers and about 600 nanometers. The heat transfer mixture comprises between about 1% by volume and about 20% by volume of the nanopowder. The heat transfer mixture comprises between about 0.1% by volume and about 3% by volume of the chelating agent. The heat transfer mixture comprises between about 0.1% by volume and about 3% by volume of the surfactant. The heat transfer mixture has a pH between about 8.5 and about 12.0. In some embodiments, the heat transfer mixture is free of carbon nanoparticles.

In one embodiment, in accordance with the principles of the present disclosure, a heat transfer mixture comprises or consists of between about 25% by volume and about 50% by volume of ethylene glycol, between about 30% by volume and about 70% by volume of water, between about 1.0% by volume and about 20% by volume of a nanopowder comprising $Al_2O_3$, between about 0.1% by volume and about 3% by volume of a chelating agent, between about 0.1% by volume and about 3% by volume of a surfactant and between about 0% by volume and up to about 10% by volume of an acid additive. The nanopowder has a particle size between about 100 nanometers and about 600 nanometers. The heat transfer mixture has a pH of about 10.0. In some embodiments, the heat transfer mixture is free of carbon nanoparticles.

BRIEF DESCRIPTION OF THE DRAWINGS

The present disclosure will become more readily apparent from the specific description accompanied by the following drawings, in which:

FIG. 7 is a graph showing results discussed in Example 1; and

FIG. 8 is a graph showing results discussed in Example 1.

Like reference numerals indicate similar parts throughout the figures.

DETAILED DESCRIPTION

Figure 1:
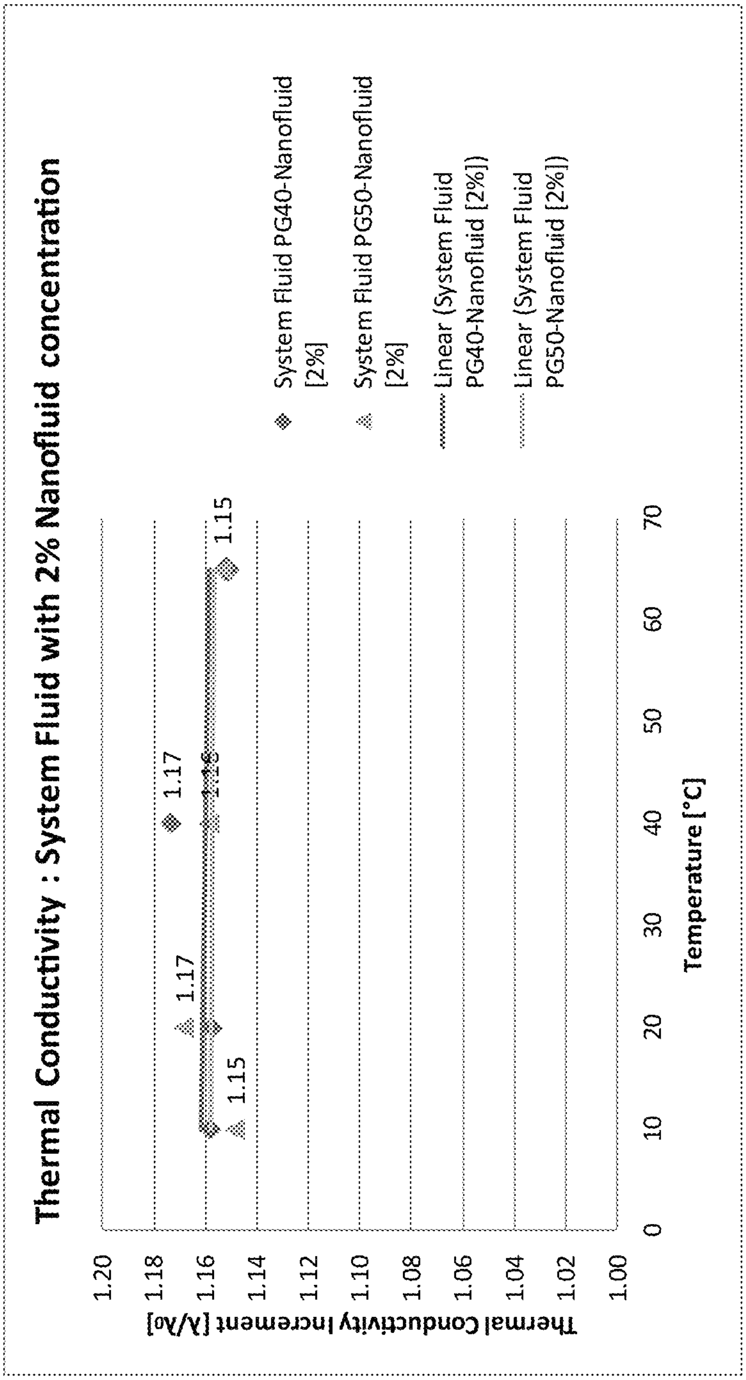
FIG. 1 is a graph showing performance characteristics of a heat transfer mixture in accordance with the principles of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. The ranges disclosed herein can include any of the upper limits of the ranges in combination with any of the lower limits of the ranges. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a heat transfer mixture and a method of making the heat transfer mixture, in accordance with the principles of the present disclosure. Alternate embodiments are also disclosed. Reference will now be made in detail to the exemplary embodiments of the present disclosure.

The present disclosure relates to formulations, processes and applications for a nanofluid having nanoparticles of Aluminum Oxide with selected specifications in terms of size properties and morphology as well as the ability to be stably suspended inside a base fluid with a specific chemical composition. In some embodiments, a solid phase is dispersed in a liquid or liquid phase. The solid phase is made of clusters that have a dimension such to avoid phonon scattering that might occur at the liquid solid interphase. The heat transfer mixture of the present disclosure is formulated and processed, taking the above into account, to maximize the heat transfer capability of the nanofluid. In some embodiments, the heat transfer mixture of the present disclosure is a high concentration nanofluid with about 1% to about 20% in volume of nanoparticles which can be installed into a thermal system with a retrofit solution which feeds the existing heat transfer fluid into the thermal system.

A nanofluid is a heterogeneous suspension or mixture comprising two phases, a solid phase and a liquid phase, in which the dimensions of the solid phase components in suspension are nanometric. The two phases of the suspension are also separable through mechanical methods, since the substances used to form the heterogeneous mixture or suspension do not modify their structure, as is the case, for example, in the solutions. The presence of Aluminum Oxide nanoparticles gives the nanofluid relevant thermal and fluid dynamic properties compared to the base fluid. For example, the thermal conductivity, heat capacity, viscosity, density and electrical conductivity.

In many nanofluids known as the state of the art, the nanoparticles of the solid phase have a tendency to deposit due to gravity. This is a phenomenon that has several consequences because it causes a reduction of the volumetric concentration of the nanoparticles inside the nanofluid therefore the thermal and fluid properties are different than expected. Furthermore, in an unstable nanofluid the particles tend to accumulate inside the pipes where the nanofluid is installed leading to clogging thus creating an obvious problem for certain applications.

Another phenomenon observed in the nanofluids known as the state of the art is the tendency of the nanopowders to generate clusters or agglomerations (solids composed by the combination of various nanometric particles) which have substantially larger dimensions of the individual particles. This phenomenon is negative, as it modifies the properties of the nanofluid, increases the tendency for the nanoparticles to settle and significantly increases the abrasion of the fluid which can lead to failures in certain components of the system.

The heat transfer mixture of the present disclosure is configured to provide a nanofluid having a greater heat exchange capacity because it has a high thermal conductivity, a higher density and thermal capacity and provides a stable nanofluid, in which the solid phase does not tend to separate from the liquid phase or deposit on the pipe surface inside the system. In some embodiments, the heat transfer mixture of the present disclosure comprises water, propylene glycol and/or ethylene glycol as base fluid together with a chelating agent, a surfactant and additives to allow for a stable suspension.

The physical variables of the suspension as base knowledge for the stabilization process optimization are the pH of the suspension, the zeta potential of the suspension, the hydrophilic-hydrophobic balance (HLB), and the specific surface area (SSA) of the nanoparticles. A particle dispersed in a liquid generally presents at the surface the electrostatic charges that generate an electric field responsible for the redistribution of the ions present around the surface of the nanoparticles. This leads to an increase in the concentration of ions with electrical charge opposite to those on the particle surface.

This electrical charge distribution causes a variable electrical potential with the distance from the particle, called zeta potential. When two particles are so close together that their double layers overlap, they repel each other with an electrostatic force whose intensity depends on the potential zeta, and at the same time attract each other for the well-known attraction of Van der Waals forces. If the zeta potential is too low, the repulsive force is not strong enough to overcome the Van der Waals attraction between the particles, and the particles will start to agglomerate making the suspension unstable. By adding a surfactant, such as, for example, ammonium salt polyacrylate, in a water-based suspension, a high zeta potential instead prevents agglomeration and maintains uniform dispersion. The surfactant molecules intervene on the separation surfaces between the liquid phase and the solid phase with the polar part facing the liquid phase and the polar part towards the solid phase.

In some embodiments, a chelating agent, such as, for example, a sodium salt solution of polyamino-polyether, is added before the surfactant (e.g., ammonium salt polyacrylate) during the manufacture of the heat transfer mixtures disclosed herein to isolate ions (e.g., calcium, magnesium, etc.) in water to avoid the ions interacting with the surfactant in a manner that inhibits the deflocculation function of the surfactant. It is understood by one of understood by one of ordinary skill in the art that the deflocculation function of the surfactant is critical for the surfactant to perform as a surfactant. As such, it is desired to isolate the ions in water using the chelating agent before the surfactant is added in order to isolate the ions in water before the surfactant is added to avoid the ions in water from inhibiting the deflocculation function of the surfactant.

In some embodiments, about ⅔ of the total weight of the chelating agent present in the heat transfer mixture is added to water and a slurry of aluminum oxide powder and water and about ⅔ of the total weight of the surfactant present in the heat transfer mixture is added after the about ⅔ of the chelating agent present in the heat transfer mixture is added to the water and the slurry. Propylene glycol or ethylene glycol is added following the addition of the ⅔ of the surfactant present in the heat transfer mixture. A combination of the water, the slurry, ⅔ of the chelating agent present in the heat transfer mixture, ⅔ of the surfactant present in the heat transfer mixture and the propylene glycol/ethylene glycol are wet milled following the addition of the ⅔ of the surfactant present in the heat transfer mixture. Milling process is made in two passages in continuous grinding mode at 5.5 V/h of the heat transfer mixture wet and with rotational speed of the rotor of 16 m/s. Grinding media is made of Yitria Zirconia beads with size of 0.1-0.4 mm and residential time of the mixture in the grinding chamber is 3.8 minutes. Milling machine is cooled by a cooling water in order to keep the temperature of the product inside the chamber below 50° C. After the first passage thought the mill, the mixture is processed again at the same conditions as the first passage. After the milling, ⅓ of the total weight of the chelating agent present in the heat transfer mixture is added. ⅓ of the total weight of the surfactant present in the heat transfer mixture is added after ⅓ of the total weight of the chelating agent present in the heat transfer mixture is added. In some embodiments, a combination ⅓ of the total weight of the chelating agent present in the heat transfer mixture, ⅓ of the total weight the surfactant present in the heat transfer mixture and the milled combination of the water, the slurry, ⅔ of the chelating agent present in the heat transfer mixture, ⅔ of the surfactant present in the heat transfer mixture and the propylene glycol/ethylene glycol are fluidized at high pressure. Fluidizing process consists in the passage of the heat transfer mixture through the a microchannel of 87 microns. The mixture is boost though the channel at pressure between 1000 bar and 2000 bar. Mixture velocity through the channel is 400 m/s therefore share rate is necessary to reduce furthermore the nanoparticles size to the biggest size of 600 nm. The wet milled combination of the chelating agent, the surfactant and the milled combination of the water, the slurry, ⅔ of the chelating agent, ⅔ of the surfactant and the propylene glycol/ethylene glycol are then mixed to produce the heat transfer mixture.

In some embodiments, the total weight of the chelating agent is less than the total weight of the surfactant. Total weight of Chelating agent is 0.01%-0.11% (0.09% is the exact value) in weight of the heat transfer mixture while surfactant is 0.02%-0.13% (0.11% is the exact value) in weight of the heat transfer mixture. In some embodiments, the total weight of the chelating agent is between about 0.05% and about 0.4% of the total weight of the nanopowder (aluminum oxide powder) Total weight of Nanopowder is 38%-42% (41% is the exact value) in weight of the heat transfer mixture. In some embodiments, the total weight of the chelating agent is between about 0.75% and about 0.35% of the total weight of the nanopowder. In some embodiments, the total weight of the chelating agent is between about 0.1% and about 0.3% of the total weight of the nanopowder. In some embodiments, the total weight of the chelating agent is about 0.2306% of the total weight of the nanopowder. Chelating agent is necessary to inhibit the cations content in the water of the base fluid. The amount of the chelating agent is related to the amount of the water in the base fluid in order to warranty the enough inhibition effect. If less chelating agent is added then part of the cations remain free to interact with surfactant reducing its benefits on nanoparticles stability of the mixture that is a less desirable result.

In some embodiments, the total weight of the surfactant is greater than the total weight of the chelating agent. In some embodiments, the total weight of the surfactant is between about 0.02% and about 0.4% of the total weight of the nanopowder (aluminum oxide powder). In some embodiments, the total weight of the surfactant is between about 0.75% and about 0.35% of the total weight of the nanopowder. In some embodiments, the total weight of the surfactant is between about 0.1% and about 0.3% of the total weight of the nanopowder. In some embodiments, the total weight of the surfactant is about 0.2606% of the total weight of the nanopowder. Amount of surfactant higher than 0.13% in weight of nanopowder present causes a flocculating effects on the nanoparticles with negative effects on stability of the mixture.

In some embodiments, the Heat transfer mixture of the present disclosure is a biphasic mixture consisting of a liquid fraction and a solid fraction including: Aluminum Oxide nanoparticles, pure water, propylene glycol or ethylene glycol, a chelating agent, a surfactant and sodium hydroxide. In some embodiments, the heat transfer mixture of the present disclosure is a stable suspension with relevant concentration of nanoparticles up to about 20% in volume. It can be diluted up to 1:20 in order to obtain the system fluid desired. Despite the dilution, the nanofluid is stable and contains enough additive to prevent corrosion and to keep the suspension stable in the final system destination. In some embodiments, the heat transfer mixture of the present disclosure shows stability for at least 1680 hours. In particular, by adding a high concentration nanofluid in a base heat transfer fluid made of water and propylene glycol or ethylene glycol, the thermal conductivity increment is achieved. For example, the thermal conductivity increment of the base fluid made of water and propylene glycol at 60:40 volume concentration is obtained by adding the high concentration of stable nanofluid. In fact, with 2% nanofluid concentration in the system fluid and propylene glycol at 40% in volume, the thermal conductivity increment achieved is between 15% and 17%. FIG. 1 shows the thermal conductivity increment obtained by adding the nanofluid to the base fluid made of water and propylene glycol at 60:40 volume concentration.

In some embodiments, the heat transfer mixture of the present disclosure is an engineered suspension of nanometer-sized solid particles in a base fluid. Suspending small solid particles in the energy transmission fluids can improve their thermal conductivity and provides an effective and innovative way to significantly enhance their heat transfer characteristics by increasing convective heat transfer in closed loop hydronic systems, reducing energy demand. The heat transfer mixture of the present disclosure can be applied to various industrial and commercial HVAC systems and related components including chillers, heat exchangers, boilers and energy recovery units. Heat exchangers are sized for certain approach temperatures. The lower the approach operational temperature, the larger the heat exchanger. In fact, the specific surface of heat exchangers depends on the temperature difference between the two thermal fluids. The surface area S of heat exchangers that is needed for exchanging an amount Qtot of heat in time Δt depends also on the fluids involved and on the material properties of the exchanger surface that is subject to degradation over time. Because the heat transfer mixture of the present disclosure leads the system fluid to higher thermal conductivity and mass flow rate, it increases heat transfer between the air and the thermal fluid, thereby increasing heat exchanger performance.

Figure 2:
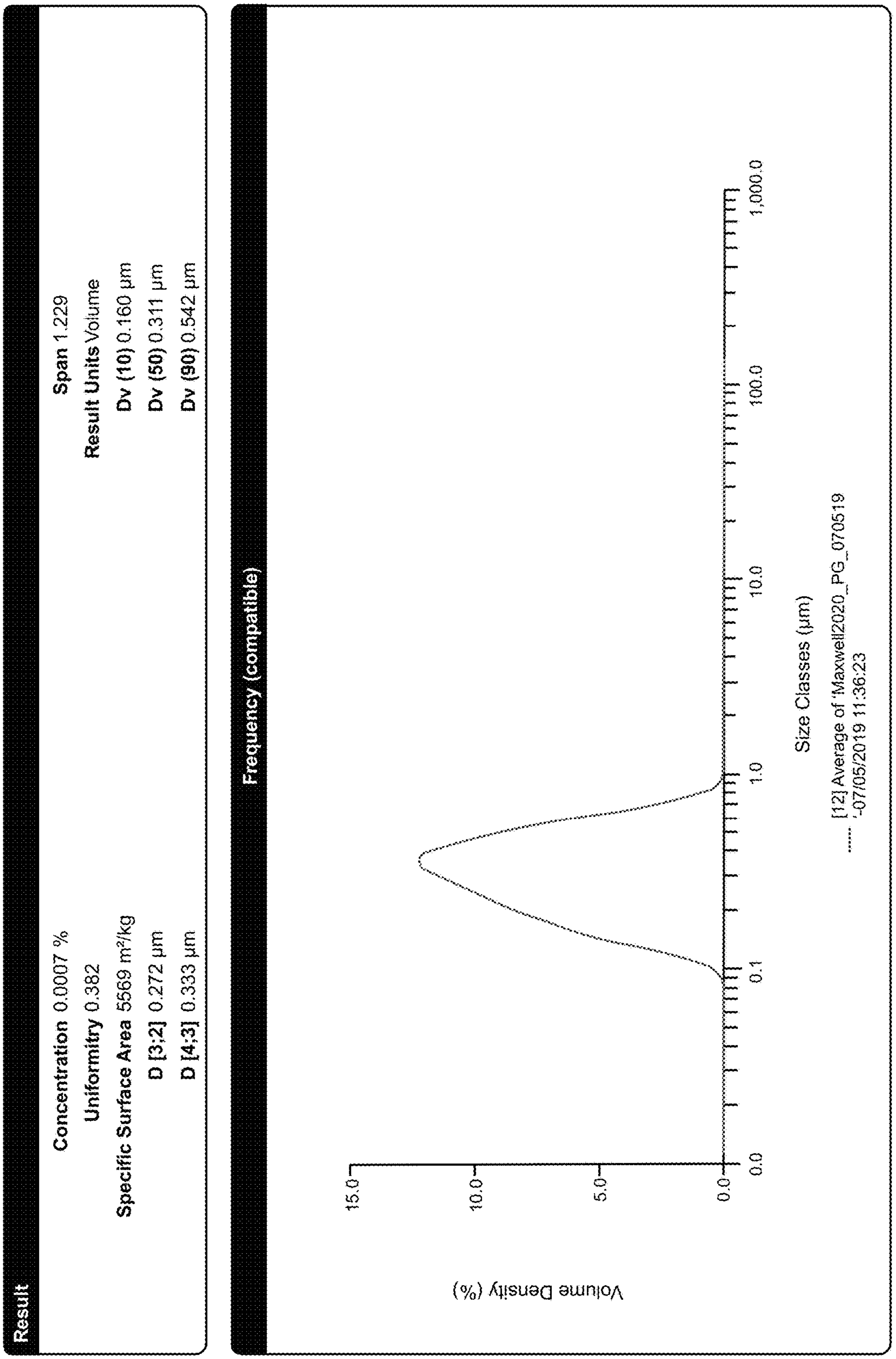
FIG. 2 is a graph showing performance characteristics of a heat transfer mixture in accordance with the principles of the present disclosure.
Figure 3:
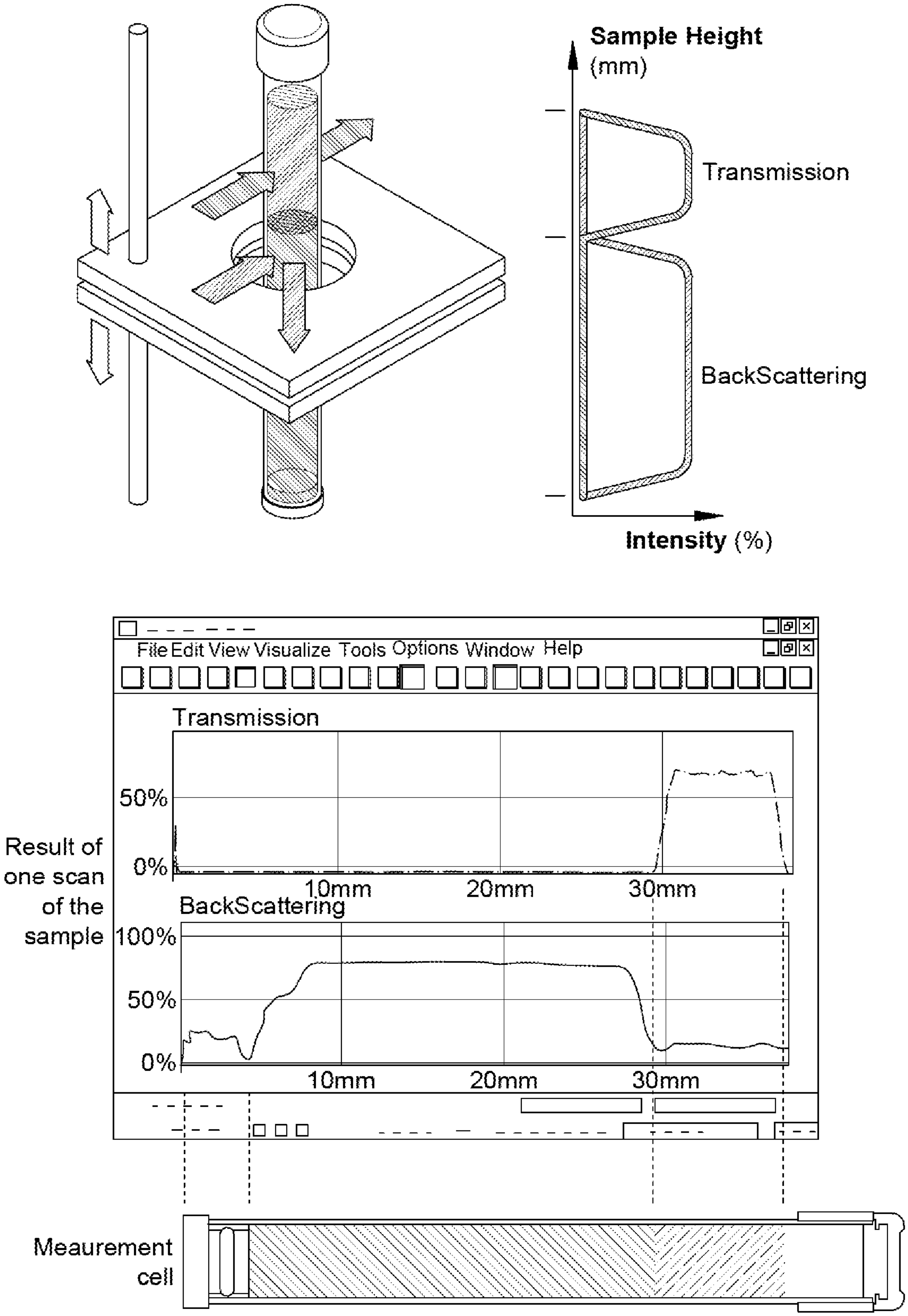
FIG. 3 is a perspective view showing operation of a test device discussed in Example 1.

In some embodiments, the heat transfer mixture of the present disclosure comprises Aluminum Oxide ($Al_2O_3$) [10-20% in volume], a chelating agent, a surfactant and base fluid made of Water [15%-90%] plus propylene glycol or ethylene glycol [75%-0%]. In some embodiments, the chelating agent amount is in the range of 0.1%-0.3% in weight of the total nanoparticle weight. In some embodiments, the chelating agent amount is 0.2306% in weight of the total nanoparticle weight. In some embodiments, the surfactant amount is in the range of 0.1%-0.3% in weight of the total nanoparticle weight. In some embodiments, the surfactant amount is 0.2606% in weight of the total nanoparticle weight. In volume, the chelating agent and the surfactant are each between about 0.1% to about 3% of the nanofluid volume in the mixture. The size distribution curve of the clusters of nanoparticles is required to be at least 50% of the nanoparticle volume in the range of diameter 100 nm<D<600 nm. FIG. 2 shows the size distribution curve of the clusters of nanoparticles used in the heat transfer mixture of the present disclosure.

In some embodiments, the following condition in the formulation is used to keep the nanofluid stable by additional surfactant as a function of the amount of glycol, the nanoparticles concentration: $1=a_{pg}+b_w+C_{np}+d_{ca}+e_{sf}+f_{bs}+g_{ac}+h_{ci}$. The parameter ranges are: $0.293<a_{pg}<0.488$; $0.354<b_w<0.683$; $0.01<C_{np}<0.2$; $?<d_{ca}<?$; $0.0012<e_{sf}<0.0234$; $0.013<f_{bs}<0.068$; $0.013<g_{ac}<0.068$; and $0.0002<h_{ci}<0.001$. The ratios of the variables are as follows: $a_{pg}$=Vpg/Vnf; $b_w$=Vw/Vnf; $C_{np}$=Vpw/Vnf; $d_{ca}$-Vca/Vnf; $e_{sf}$=Vsf/Vnf; $f_{bs}=V_{bs}$/Vnf; $g_{ac}$=Vac/Vnf; and $g_{ci}$=Vci/Vnf. The variables are defined as follows: Vnf=Volume of nanofluid; Vpg=Volume of propylene glycol; Vw=Volume of water; Vpw=Volume of nanopowder; Vca=Volume of chelating agent; Vsf=Volume of surfactant; Vbs=Volume of base; and Vac=Volume of acid. In some embodiments, the heat transfer mixture comprises ethylene glycol in place of, or in addition to, propylene glycol. In some embodiments, the heat transfer mixture does not include a base and consists of propylene glycol or ethylene glycol, water, the nanopowder, the chelating agent, the surfactant, the acid, and the corrosion inhibitor. In some embodiments, the heat transfer mixture does not include the base or the acid and consists of propylene glycol or ethylene glycol, water, the nanopowder, the chelating agent, the surfactant and the corrosion inhibitor. In some embodiments, the heat transfer mixture does not include the acid and consists of propylene glycol or ethylene glycol, water, the nanopowder, the chelating agent, the surfactant, the base, and the corrosion inhibitor.

In some embodiments, the chelating agent comprises or consists of a sodium salt solution of polyamino polyether methylene phosphonic acid [CAS:130668-24-5] and the concentration of the chelating agent by volume in the nanofluid is about 1% to about 3% by volume. In some embodiments, the chelating agent is anionic, such as, for example, the chelating agent shown below.

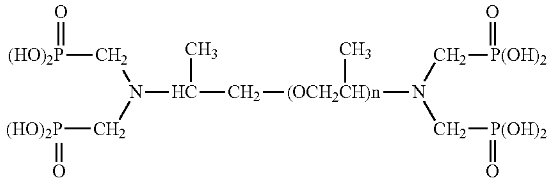

In some embodiments, the surfactant comprises or consists of ammonium salt polyacrylate [CAS: 9003-03-6] and the concentration of the surfactant by volume in the nanofluid is about 1% to about 3% by volume. In some embodiments, the surfactant is an anionic surfactant.

In some embodiments, the surfactant comprises nonionic, anionic, cationic and amphoteric surfactants and blends thereof. In some embodiments, uitable nonionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants selected from the group consisting of alkali metal alkyl sulfates, alkyl ether sulfonates, alkyl sulfonates, alkyl aryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters. Suitable cationic surfactants include, but are not necessarily limited to, arginine methyl esters, alkanolamines and alkylene diamides. Suitable surfactants may also include surfactants containing a non-ionic spacer-arm central extension and an ionic or nonionic polar group. Other suitable surfactants are dimeric or gemini surfactants and cleavable surfactants.

In some embodiments, suitable surfactants include an alkali-free anionic polyelectrolyte, a carbonic acid salt, a polycarbonic acid salt, a carbonic acid ester, a benzenedisulfonic acid disodium salt, a triammonium salt of aurintricarboxylic acid, sodium pyrophosphate, diammonium hydrogen citrate, citric acid, ammonium polyacrylate, and ammonium salt of polymethacrylic acid. In some embodiments, the ammonium salt of polymethacrylic acid is DOLAPIX CE64 having CAS Number 30875-88-8 and the following chemical formula:

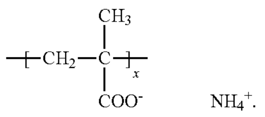

In some embodiments, suitable surfactants include one or more of any of the surfactants discussed herein.

In some embodiments, the amount of surfactant used is optimized as function of the nanoparticles' weight and size distribution. In some embodiments, the surfactant comprises high temperature resistant compounds (Tmax=220° C.) which provides a fundamental advantage in the process because it is possible to mix it before the grinding process without any degradation due to high temperature of the grinding media friction. Having the surfactant included during the mill process optimizes the process by enhancing the dispersant effect on nanopowder.

In some embodiments, the nanoparticles are clusters in a range between 100-600 nm. The solid phase is made of clusters that have a dimension such to avoid phonon scattering that might occur at the liquid solid interphase. This condition optimizes the heat transfer effects and the thermal waves propagation. In some embodiments, to achieve this size distribution of the clusters, a grinding media of 0.3 mm and a grinder with 4500 rpm is used for 3 hours.

In some embodiments, the heat transfer mixture of the present disclosure includes nanoparticles that form clusters or agglomerates, i.e. particles made up from the union of many nanometric particles which have dimensions substantially greater than the single particles. It was previously believed that this phenomenon had a negative effect as it was believed that clusters only increased the likelihood of sedimentation. However, it has been found that when the clusters or agglomerates of nanoparticles within certain dimensions are combined with a surfactant additive, they can help to increase the effective thermal properties of the heat transfer mixture.

In some embodiments, the heat transfer mixture of the present disclosure provides a stable nanofluid, wherein the solid phase does not tend to be separated from the liquid phase, depositing on the bottom of the containers in which the nanofluid is stored or in the system's pipes where it is utilized. In some embodiments, the solid phase of the heat transfer mixture of the present disclosure comprises aluminum oxide nanopowder. In some embodiments, the liquid phase of the heat transfer mixture of the present disclosure comprises water, a chelating agent and a surfactant. In particular, as explained in detail in the following, the characteristics which determine the heat exchange capacity and the stability of the nanofluid are the morphological, dimensional and structural characteristics of the solid component and the presence and concentration of chemical additives in the liquid phase. The factors to be worked on to stabilize the suspension with respect to the nanoparticles' aggregation include the suspension pH, the interface tension and the surface electrostatic charge of the nanoparticles.

Generally, a particle dispersed in a liquid, at the surface has electrostatic charges which determine an electric field responsible for the redistribution of the ions provided in the space surrounding the same particle. This leads to an increase in ion concentration of charge opposite to the one of the particles at the surface. In particular, the liquid layer surrounding the particle is made up of two zones: an inner one (Stern layer) with ions strongly linked to the particle, and an outer one (Gouy-Chapman layer or diffused layer), where the electrostatic interactions are weaker. The two zones constitute a double electric layer around each particle. Inside the diffused layer two zones can be defined, separated by a plane which is the shear plane. When the particle moves, the ions of the diffused layer closer to the particle than to the shear plane move with it while those beyond the shear plane are continually substituted by other ions present in the liquid.

This charge distribution determines an electric potential variable according to the distance of the particle, which is the zeta potential. When two particles are so close that their double layers overlap, these repel each other with an electrostatic force whose intensity depends on the zeta potential, and at the same time they attract each other by the known Van der Waals attraction. If the zeta potential is too low, the repelling force is not strong enough to exceed the Van der Waals force between the particles, and these begin to agglomerate thus making the suspension instable. A high zeta potential avoids agglomeration and maintains uniformity in the dispersion.

Another condition on which the suspension stability depends is the wettability status of the solid particles, i.e. the capacity of the liquid to be distributed on the surface of a solid, which depends on the surface tensions of the liquid phase and solid phase. In fact, when a liquid and a solid come in contact, an interface tension results owing to the interactions between the phases. Assuming that a liquid drop is in contact with a solid surface, the profile of a liquid portion arranged on a solid surface forms a Θ angle, which is the wettability angle, which is greater or lesser than 90° depending on whether the cohesion forces prevail between the liquid molecules or whether the adherence forces prevail between the molecules of the two different solid and liquid phases. The Θ angle can be expressed by the following relation:

$$\cos(\Theta) = (YS - ySL)/yL \quad (1)$$

where yS, ySL and yL are respectively the surface tensions between the solid and the air, the solid and the liquid (interface tension) and the liquid and the air. From (1) it is noted how the wettability of the liquid can be increased by decreasing the surface tension of the liquid.

To obtain such a result inside the suspension, thus decreasing the aggregation tendency of the particles, we introduce substances that influence the liquid-solid surface tension (one or more surfactants). In some embodiments, surfactants, as discussed herein, are a class of organic compounds comprising a hydrophilic portion (polar, presenting affinity with water and so soluble) and a hydrophobic portion (nonpolar, presenting affinity with oil substances and so insoluble in water). By adding a surfactant in the water-based suspension, the surfactant molecules arrange themselves on the separation surfaces between the liquid phase and the solid phase with the polar portion towards the liquid phase and the non-polar portion towards the solid phase (or aeriform in case of liquid-air separation surface). However, in order for certain surfactants (e.g., ammonium salt polyacrylate) to be effective, a chelating agent, such as, for example, a sodium salt solution of polyamino-polyether, is added before the surfactant during the manufacture of the heat transfer mixtures disclosed herein to isolate ions (e.g., calcium, magnesium, etc.) in water to avoid the ions interacting with the surfactant in a manner that inhibits the deflocculation function of the surfactant. More specifically, about ⅔ of each of the chelating agent and the surfactant is added to a combination of a slurry of water and nanoparticles. Propylene glycol or ethylene glycol is added to the combination that includes the ⅔ of the chelating agent and the ⅔ of the surfactant. About ⅓ of each of the chelating agent and the surfactant is added to the combination that includes the ⅔ of the chelating agent, ⅔ of the surfactant and propylene glycol or ethylene glycol.

In some embodiments, the solid phase of the heterogeneous mixture comprises aluminum oxide nanoparticles with specific morphology and dimensions. In some embodiments, the solid phase dispersed in the liquid is made up of particles of nanometric dimensions (nanopowders or nanoparticles) with an average dimension between about 100 nanometers and about 600 nanometers. In some embodiments, the solid phase dispersed in the liquid is made up of particles of nanometric dimensions (nanopowders or nanoparticles) with an average dimension between about 200 nanometers and about 500 nanometers. In some embodiments, the solid phase dispersed in the liquid is made up of particles of nanometric dimensions (nanopowders or nanoparticles) with an average dimension between about 300 nanometers and about 400 nanometers. In some embodiments, the solid phase dispersed in the liquid is made up of particles of nanometric dimensions (nanopowders or nanoparticles) with an average dimension between about 400 nanometers and about 600 nanometers. In some embodiments, the solid phase dispersed in the liquid is made up of particles of nanometric dimensions (nanopowders or nanoparticles) with an average dimension between about 100 nanometers and about 600 nanometers. In some embodiments, the solid phase dispersed in the liquid is made up of particles of nanometric dimensions (nanopowders or nanoparticles) with an average dimension between about 300 nanometers and about 600 nanometers. In some embodiments, the solid phase dispersed in the liquid is made up of particles of nanometric dimensions (nanopowders or nanoparticles) with an average dimension between 100 nanometers and 600 nanometers. In some embodiments, the solid phase dispersed in the liquid is made up of particles of nanometric dimensions (nanopowders or nanoparticles) with an average dimension between 300 nanometers and 600 nanometers.

In some embodiments, the concentration of the nanopowders or nanoparticles is between about 0.1% by volume of the nanofluid and about 50% by volume of the nanofluid. In some embodiments, the concentration of the nanopowders or nanoparticles is between about 1.0% by volume of the nanofluid and about 40% by volume of the nanofluid. In some embodiments, the concentration of the nanopowders or nanoparticles is between about 2% by volume of the nanofluid and about 30% by volume of the nanofluid. In some embodiments, the concentration of the nanopowders or nanoparticles is between about 3% by volume of the nanofluid and about 30% by volume of the nanofluid. In some embodiments, the concentration of the nanopowders or nanoparticles is between about 4% by volume of the nanofluid and about 30% by volume of the nanofluid. In some embodiments, the concentration of the nanopowders or nanoparticles is between about 5% by volume of the nanofluid and about 30% by volume of the nanofluid. In some embodiments, the concentration of the nanopowders or nanoparticles is between about 6% by volume of the nanofluid and about 25% by volume of the nanofluid. In some embodiments, the concentration of the nanopowders or nanoparticles is between about 10% by volume of the nanofluid and about 20% by volume of the nanofluid. In some embodiments, the concentration of the nanopowders or nanoparticles is between 0.1% by volume of the nanofluid and 50% by volume of the nanofluid. In some embodiments, the concentration of the nanopowders or nanoparticles is between 1.0% by volume of the nanofluid and 40% by volume of the nanofluid. In some embodiments, the concentration of the nanopowders or nanoparticles is between 2% by volume of the nanofluid and 30% by volume of the nanofluid. In some embodiments, the concentration of the nanopowders or nanoparticles is between 3% by volume of the nanofluid and 30% by volume of the nanofluid. In some embodiments, the concentration of the nanopowders or nanoparticles is between 4% by volume of the nanofluid and 30% by volume of the nanofluid. In some embodiments, the concentration of the nanopowders or nanoparticles is between 5% by volume of the nanofluid and 30% by volume of the nanofluid. In some embodiments, the concentration of the nanopowders or nanoparticles is between 6% by volume of the nanofluid and 25% by volume of the nanofluid. In some embodiments, the concentration of the nanopowders or nanoparticles is between 10% by volume of the nanofluid and 20% by volume of the nanofluid.

In some embodiments, the heat transfer mixture of the present disclosure is a biphasic mixture made up of a liquid fraction and a solid fraction; the liquid fraction comprises water, propylene glycol or ethylene glycol, a chelating agent, a surfactant, pH corrector additives in such a concentration to maximize the zeta potential and to minimize the interface tension between solid phase and liquid phase, and anticorrosive agents.

In some embodiments, the mass ratio between the chelating agent quantity and/or the surfactant quantity present in the liquid phase and the quantity of nanopowders is between about 2% and about 4%. In some embodiments, the mass ratio between the chelating agent quantity and/or the surfactant quantity present in the liquid phase and the quantity of nanopowders is between about 2.5% and about 3.5%. In some embodiments, the mass ratio between the chelating agent quantity and/or the surfactant quantity present in the liquid phase and the quantity of nanopowders is about 3%. In some embodiments, the mass ratio between the chelating agent quantity and/or the surfactant quantity present in the liquid phase and the quantity of nanopowders is between 3.5%.

In some embodiments, the concentration of the chelating agent and/or the surfactant is between about 0.1% by total volume of the nanofluid and about 3% by total volume of the nanofluid. In some embodiments, the concentration of the chelating agent and/or the surfactant is between about 0.5% by total volume of the nanofluid and about 2.5% by total volume of the nanofluid. In some embodiments, the concentration of the chelating agent and/or the surfactant is between about 1% by total volume of the nanofluid and about 2% by total volume of the nanofluid.

In some embodiments, the nanoparticles in the nanofluid have regular morphology, in particular spherical morphology allowing for optimizing the heat exchange capacity and reducing the tendency for the nanoparticles to be trapped on the surfaces of the pipes. In some embodiments, the nanoparticles in the nanofluid have an irregular morphology. In some embodiments, the nanoparticles in the nanofluid are in the form of clusters.

In some embodiments, the heat transfer mixture of the present disclosure has a density (at 20° C.) between 1 $g/cm^3$ and 1.65 $g/cm^3$. In some embodiments, the heat transfer mixture of the present disclosure has a dynamic viscosity (at 20° C.) between 1 cps and 30 cps. In some embodiments, the heat transfer mixture of the present disclosure at 2% nanoparticle concentration has thermal conductivity increment (at 20° C.) between 15% and 17% and the increment in terms of thermal conductivity is linear with the concentration in the heat transfer mixture.

In some embodiments, the mixing step (the mixing of the wet milled combination of the chelating agent, the surfactant and the milled combination of the water, the slurry, ⅔ of the chelating agent, ⅔ of the surfactant and the propylene glycol/ethylene glycol), the wet milled combination of the chelating agent, the surfactant and the milled combination of the water, the slurry, ⅔ of the chelating agent, ⅔ of the surfactant and the propylene glycol/ethylene glycol is mixed in quantities such that the desired solid volume percentage is reached. The mixing is accomplished using a cold grinder that is kept at a low temperature to avoid any temperature increase due to the friction with the grinding media. The solution is milled based on continuous mill, which consists of a jug inside with zirconia grains. By using this method, the clusters of nanoparticles are not crushed. Grain diameter=0.3 mm−1 mm depending on the mixture concentration. After mixing, the outlet nanofluid is collected in a continuous fluidizer. The fluidizer utilizes a mechanical process which subjects the nanofluid to an extremely high shear rate. During the process, the fluid achieves a speed up to 400 m/s through a microchannel with a diamond coating where the clusters are reduced to a selected size. In some embodiments, the nanofluid preparation does not involve sonication. In some embodiments, sodium hydroxide is used to adjust the pH of the nanofluid to 10.0.

In some embodiments, the liquid component of the heat transfer mixture of the present disclosure does not a base additive, an acid additive, and/or a corrosive inhibitor. In some embodiments, the liquid component of the heat transfer mixture of the present disclosure includes a base as the only additive of the base additive, the acid additive and the corrosive inhibitor. In some embodiments, the liquid component of the heat transfer mixture of the present disclosure includes an acid as the only additive of the base additive, the acid additive and the corrosive inhibitor. In some embodiments, the liquid component of the heat transfer mixture of the present disclosure includes a corrosive inhibitor as the only additive of the base additive, the acid additive and the corrosive inhibitor. In some embodiments, the base additive comprises sodium hydroxide [NaOH], potassium hydroxide [KOH], calcium hydroxide [$Ca(OH)_2$] and is used to increase the pH of the product after the preparation process due to the fact that in some embodiments pH is 10 is the required basic level to warranty the stability of the nanoparticles in the suspension. In fact, the "zeta potential" related to the electrochemical field around the nanoparticle in the fluid is more pronounced when pH is higher than 8.5. In some embodiments, the acid additive comprises hydrochloric acid, acetic acid, and/or phosphoric acid and is used in the formulation of the nanofluid with ethylene glycol since in that case the pH is higher than 10 and the acid is necessary to reduce the pH to 10 for a stable nanofluid suspension. In some embodiments, the corrosive inhibitor comprises molybdate anion, calcium nitrite, zinc phosphate, chromates and/or lanthanide compounds and is used to avoid corrosion phenomena between the nanoparticles and the metal surface of the system where it is installed. The inhibitors are useful to avoid pitting phenomena resulting from the deposit and contact between nanoparticles and metal surfaces.

In some embodiments, the liquid component of the heat transfer mixture of the present disclosure includes one or more additives to provide other desired chemical and physical properties and characteristics. In some embodiments, the additives include a base additive, an acid additive and/or a corrosive inhibitor in addition to the components discussed above. That is, the heat transfer mixture of the present disclosure can include a base additive, an acid additive and/or a corrosive inhibitor in addition to water, the nanoparticles, the chelating agent, the surfactant and propylene glycol and/or ethylene glycol. In some embodiments, the base additive, the acid additive and/or the corrosive inhibitor are combined with the nanoparticles, the chelating agent, the surfactant and propylene glycol and/or ethylene glycol during the mixing step.

In some embodiments, the base additive is configured to increase the pH of the nanofluid. In some embodiments, the heat transfer mixture comprises propylene glycol and the surfactant produce a fluid having a pH below 7. As such, a base additive, such as, for example, sodium hydroxide is used to increase the pH up to 10. In some embodiments, the base additive includes KOH, NaOH, $NaHCO_3$, $Ca(OH)_2$, $K_2CO_3$, and/or $Na_2CO_3$. In some embodiments, the acid additive is configured to decrease the pH of the nanofluid. In some embodiments, the heat transfer mixture comprises ethylene glycol to produce a fluid with a pH that is higher than 10. The acid is therefore used to reduce the pH to 10 to reduce corrosion phenomena. In some embodiments, the acid additive includes hydrochloric acid, acetic acid and/or phosphoric acid. In some embodiments, the corrosive inhibitor is configured to prevent corrosion of the nanoparticles. In some embodiments, the corrosive inhibitor includes molybdate anion, calcium nitrite, zinc phosphate, chromates and/or lanthanide compounds and is used to avoid corrosion phenomena between the nanoparticles and the metal surface of the system where it is installed. The inhibitors are useful to avoid pitting phenomena resulting from the deposit and contact between nanoparticles and metal surfaces.

In some embodiments, the base additive includes triazoles, such as tolyl triazole and benzotriazole, aspartic acid, sebacic acid, borax, molybdates, such as molybdic oxide and sodium molybdate dihydrate, nitrites, amine-based compounds such as ethylene diamine, propylene diamine, morpholine, short aliphatic dicarboxylic acids such as maleic acid, succinic acid, and adipic acid, thiazoles such as mercaptobenzothiazole, thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles, sulfonates, imidazolines or a combination of two or more thereof.

In some embodiments, the liquid component of the heat transfer mixture of the present disclosure does not include propylene glycol or ethylene glycol. In such embodiments, the liquid component of the heat transfer mixture of the present disclosure consists of water. In this embodiment, the heat transfer mixture represented by the formula: $1=Vw/Vnf+Vpw/Vnf+Vca/Vnf+Vsf/Vnf+Vbs/Vnf+Vac/Vnf+Vci/Vnf$, wherein Vnf is a volume of a nanofluid, wherein Vw is a volume of water, wherein Vpw is a volume of a nanopowder, wherein Vca is a volume of a chelating agent, wherein Vsf is a volume of a surfactant, wherein Vbs is a volume of a base additive, wherein Vac is a volume of an acid additive, and wherein Vci is a volume of a corrosive inhibitor. In one embodiment, the surfactant is HEDP/PBTC/PCA—etidronic acid/phosphonobutane-tricarboxylic acid/phosphino-carboxylic acid.

The heat transfer mixture of the present disclosure has a wide scope of uses including HVAC, power generation, chemical processing and data center cooling. With respect to HVAC the heat transfer mixture can be applied to various industrial and commercial HVAC systems and related components including chillers, heat exchangers, boilers and energy recovery units. In any hydronic heating and/or cooling system, the heat transfer mixture lowers heat exchanger approach temperatures, increasing heat transfer efficiency and reducing energy loss.

Example 1

To demonstrate the difference between formulations that add the chelating agent and the surfactant sequentially, as discussed above, and formulations that add the chelating agent and the surfactant at one time, a system using a Turbiscan device was used. Turbiscan operates using a near-infrared light source (850 or 880 nanometers). The light source projects photons into a fluid or solution, such as, for example, a heat transfer fluid, which repeatedly scatter off particles or heterogenous droplets dispersed in the solution. Two synchronous photodetectors acquire the scattered photons to determine the transport mean free path of light through the sample, and the average distance between scattering media. The acquired signals are respectively known as backscattering (BS) and transmission (T). Together they provide accurate particle size analysis over predetermined periods, allowing formulators to assess the evolution of particle size or volume fraction and characterize the stability of emulsions and their resistance to physical phenomena such as sedimentation and agglomeration.

The Turbiscan is a robust system designed to measure the average particle size in concentrated solutions, using Staatic Multiple Light Scattering technology to quantify the long-term stability of formulations without dilution or mechanical stress. This is established in accordance with ISO TR 13097 and can provide measurements relating to the actual dispersion state and the tendency towards agglomeration or flocculation.

The combination of Backscattering and Transmission sensors with a vertical scanner enables to detect physical heterogeneities (size increase or local concentration change) over the whole sample height with a vertical resolution up to 20 μm. Thus, nascent destabilization phenomenon can be detected in any sample locations up to 200 times faster than visual tests.

Backscattering or Transmission profiles (i.e. signal over sample height) are recorded at different time intervals to report kinetic stability. Stability kinetics are calculated over the whole sample height for a global stability assessment or on specific zone (bottom/middle/top) depending on the stability criteria. TURBISCAN Stability Index (TSI) is calculated for easy and accurate stability reporting. Patented sample positioning enables to guaranty an optimal repeatability and reproducibility.

This vertical scan macroscopic analyser consists of a reading head moving along a flat-bottomed cylindrical cell, while scanning the entire sample height. The reading head itself consists of a pulsed near infrared light source and two synchronous detectors:—The transmission detector picks up the light transmitted through the product. The backscattering detector receives the light backscattered by the product (135°). The reading head acquires transmission and backscattering data every 40 μm on a maximum height of 80 mm. The profile obtained characterise the product homogeneity, particles concentration and mean diameter. It is represented on the software screen by a curve showing the percentage of backscattered or transmitted light as a function of the sample height (in mm). The acquisition along the product is then repeated with a programmable frequency to obtain a superimposition of product fingerprints characterising the stability or instability of the product, whether they are identical or not.

Figure 4:
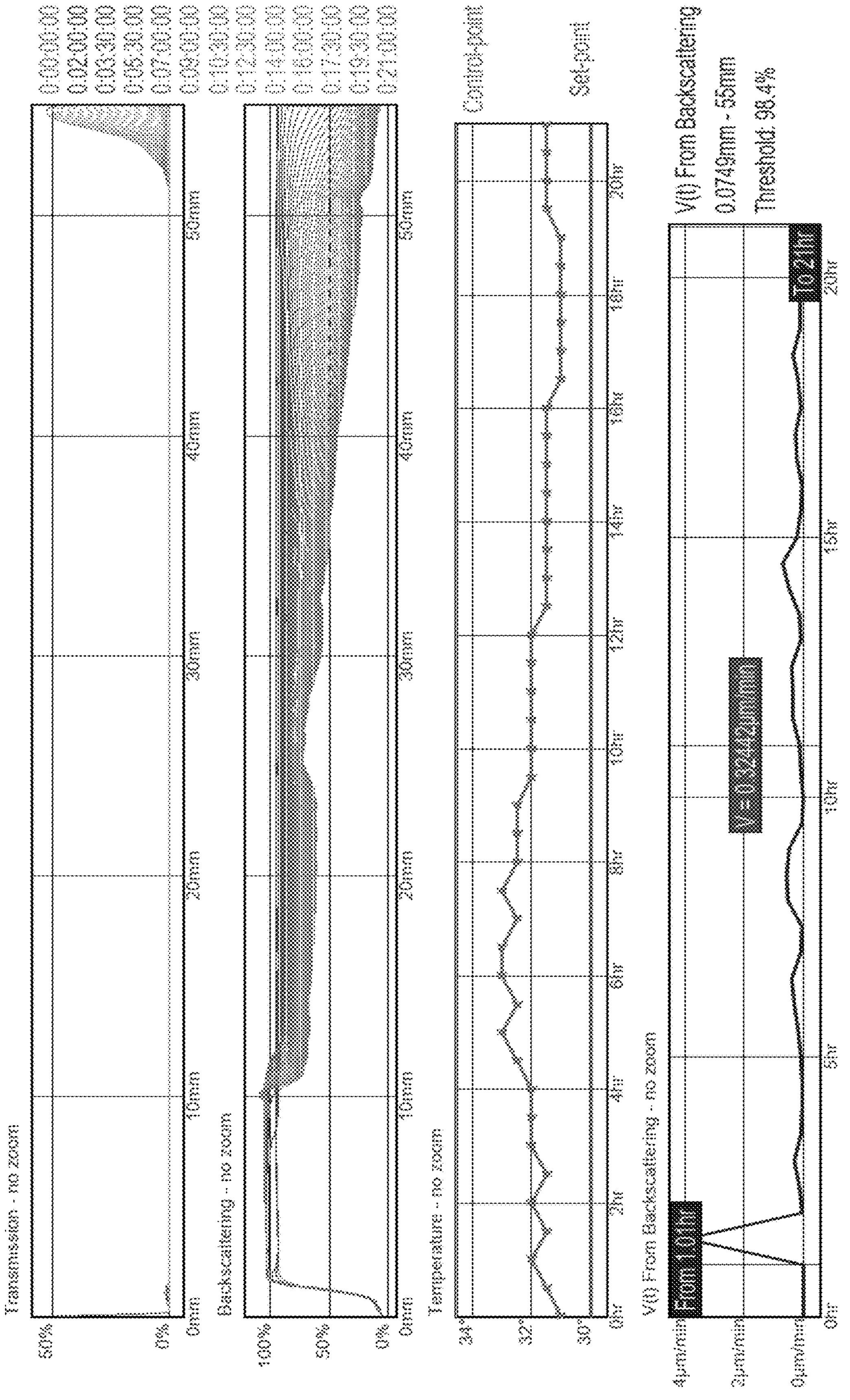
FIG. 4 is a graph showing results discussed in Example 1.

FIG. 4 shows the backscattering profile of the suspension with formulation "all additives in 1 step" inside sample of 55 mm height. That is, FIG. 4 shows test results of a formulation wherein the chelating agent and the surfactant are both added at one time, rather than sequentially. The light scattering after 24 hours test period shows that already at height 10 mm of the sample, the backscattering is not 100% anymore. The scattering of the light beam throughout the sample is related to the Nanoparticles concentration in the sample. If any sedimentation occurs, scattering starts to drop form 100%. Concentration of Nanoparticles inside the sample is constant in 10 mm of 55 mm therefore up to 18% of the volume. Full clarification of the sample is reported when backscattering is nearly 0% and Trasmission is going up to 100%. The Average sedimantation rate is v=0.324 micrometer/minute.

Figure 5:
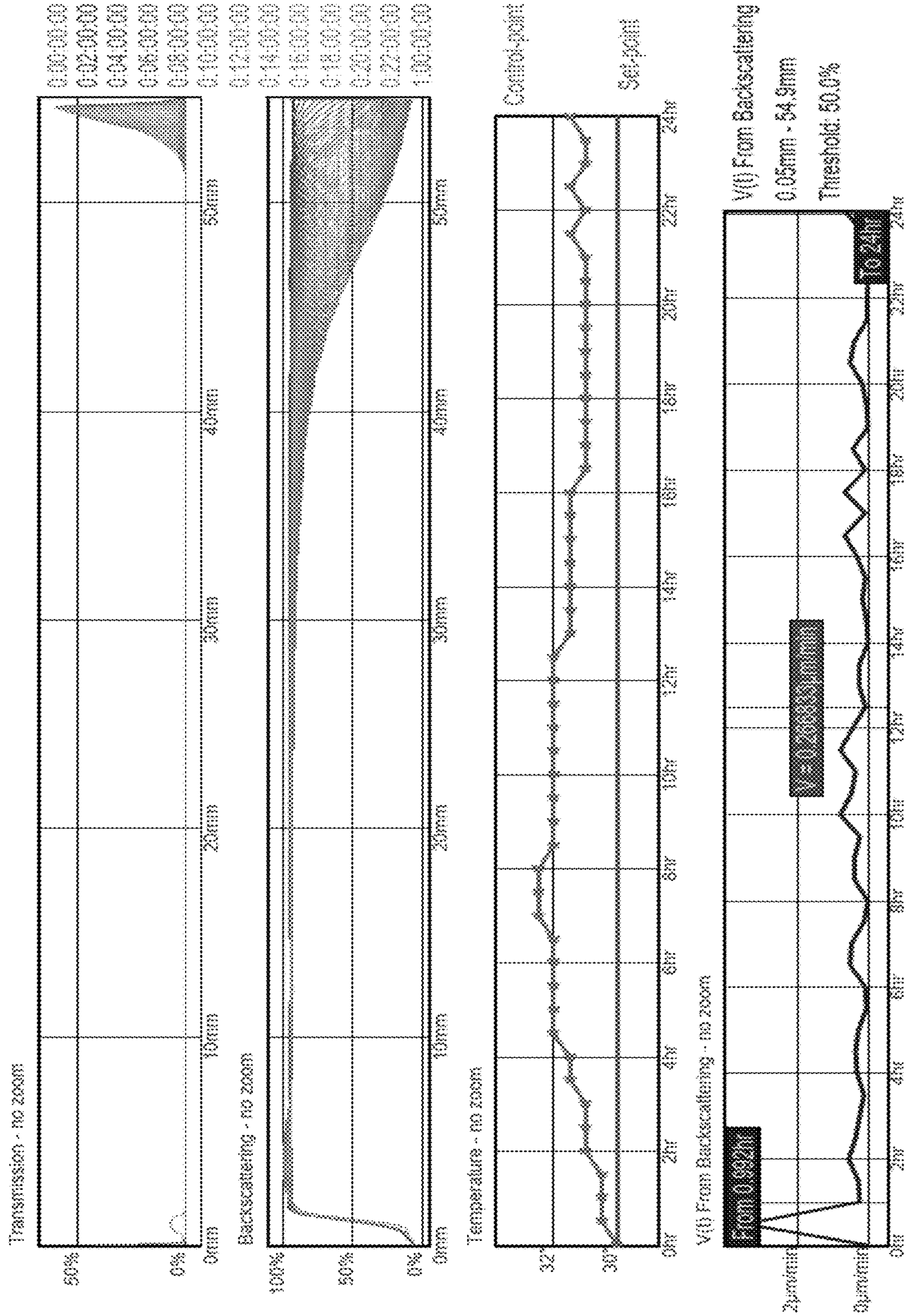
FIG. 5 is a graph showing results discussed in Example 1.

FIG. 5 shows the backscattering profile of the suspension with formulation "Sequential" inside sample of 55 mm height. That is, FIG. 5 shows test results of a formulation wherein the chelating agent and the surfactant are both added before and after a milling step, rather than all at one time.

In fact the light scattering after 24 hours test period shows that already at height 32 mm of the sample, the backscattering is not 100% anymore. The scattering of the light beam through the sample is related to the Nanoparticles concentration in the sample. Concentration of Nanoparticles inside the sample is constant in 32 mm of 55 mm therefore up to 58% of the volume. Sedimantation rate is v=0.266 micrometer/minute. It's possible to calculate the stability time of the sample knowing the height of the sample and the sedimentation rate. In fact, the couvet height is constant for all test samples, the sedimentation occurs at Vsed [micrometer/minutes], the stability time to get half of the sample volume totally sattled is calculated by: time [hours]=1000*H/(2*60*Vsed). Using results on average sedimentation rate from the previous plots, we can compare the stability of the samples with "sequential" and "1 step formulation" respectively.

Figure 6:
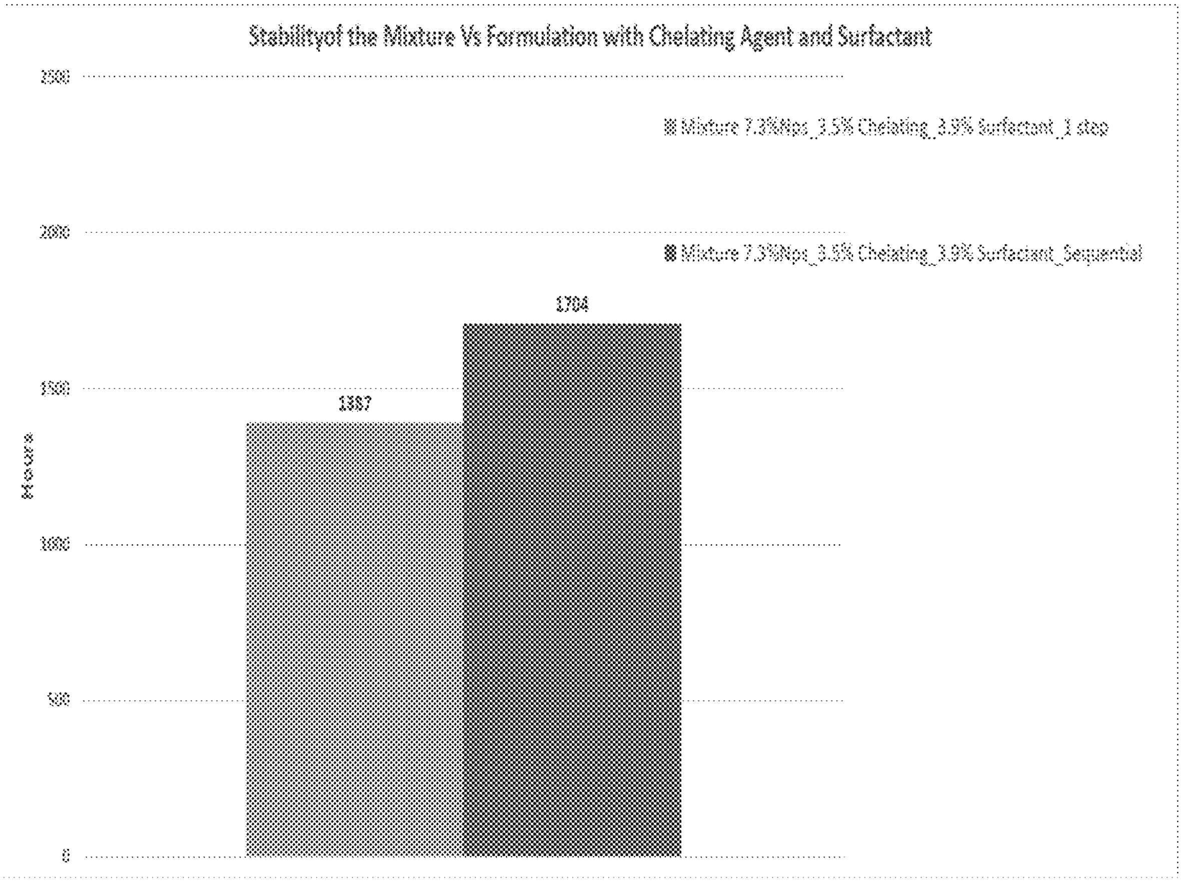
FIG. 6 is a graph showing results discussed in Example 1.

FIG. 6 shows Stability time calculated form the Average sedimentation rate since stability of the sample has a relevant impact on thermal performance of the sample in therms of thermal conductivity measurements.

FIG. 7 shows the thermal conductivity of the sample with "1 step" and "Sequential" formulation. In case of "Sequential" formulation, thermal conductivity [Lambda] over 10 measurments points is Lambda=646 mW/m*K and specific heat is Cp=4.03 KJ/kg*K as shown in FIG. 7. In case of "all 1 step" formulation, thermal conductivity over 10 measurments points is Lambda=636 mW/m*K and specific heat Cp=4.02 KJ/kg*K as shown in FIG. 8.

As discussed above, in case of formulation "Sequential", results show higher thermal conductivity and higher Specific Heat than the case of formulation "all 1 step" therefore the heat transfer capacity of the fluid with Sequential "formulation" is "higher than "all 1 step". In case of formulation "Sequential", results on sedimentation rate of the particles show longer stability time than in case of "all 1 step" formulation.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of forming a heat transfer fluid, the method comprising:

dispersing an aluminum oxide powder in water to form a slurry;

combining the slurry with water to form a first combination;

adding a first amount of a chelating agent to the first combination to form a second combination;

adding a first amount of a surfactant to the second combination to form a third combination;

adding one of the group consisting of propylene glycol and ethylene glycol to the third combination to form a fourth combination;

adding a second amount of the chelating agent to the fourth combination to form a fifth combination;

adding a second amount of the surfactant to the fifth combination to form a sixth combination; and mixing the sixth combination to form the heat transfer fluid, wherein the first amount of the chelating agent is greater than the second amount of the chelating agent.

2. The method recited in claim 1, wherein the chelating agent comprises a sodium salt solution of polyamino-polyether-methylene-phosphonic acid.

3. The method recited in claim 1, wherein the surfactant comprises ammonium salt polyacrylate.

4. The method recited in claim 1, wherein:

the chelating agent comprises a sodium salt solution of polyamino-polyether-methylene-phosphonic acid; and the surfactant comprises ammonium salt polyacrylate.

5. The method recited in claim 1, wherein the first amount of the surfactant is greater than the second amount of the surfactant.

6. The method recited in claim 1, wherein the first amount of the chelating agent is about 1.5 times to about 2.5 times greater than the second amount of the chelating agent.

7. The method recited in claim 1, wherein the first amount of the surfactant is about 1.5 times to about 2.5 times greater than the second amount of the surfactant.

8. The method recited in claim 1, wherein:

the first amount of the chelating agent is about 1.5 times to about 2.5 times greater than the second amount of the chelating agent; and the first amount of the surfactant is about 1.5 times to about 2.5 times greater than the second amount of the surfactant.

9. The method recited in claim 1, wherein the first amount of the chelating agent is 2 times greater than the second amount of the chelating agent.

10. The method recited in claim 1, wherein the first amount of the surfactant is 2 times greater than the second amount of the surfactant.

11. The method recited in claim 1, wherein:

the first amount of the chelating agent is 2 times greater than the second amount of the chelating agent; and the first amount of the surfactant is 2 times greater than the second amount of the surfactant.

12. The method recited in claim 1, further comprising milling the fourth combination.

13. The method recited in claim 1, further comprising wet milling the sixth combination before mixing the sixth combination.

14. The method recited in claim 1, wherein the aluminum oxide powder comprises a particle size between about 100 nanometers and about 600 nanometers.

15. The method recited in claim 1, wherein the heat transfer mixture comprises between about 1% by volume and about 20% by volume of the aluminum oxide powder.

16. The method recited in claim 1, wherein the heat transfer mixture comprises between about 0.1% by volume and about 3% by volume of the chelating agent.

17. The method recited in claim 1, wherein the heat transfer mixture comprises between about 0.1% by volume and about 3% by volume of the surfactant.

18. The method recited in claim 1, wherein the heat transfer mixture has a pH greater than 8.5.

19. A method of forming a heat transfer fluid, the method comprising:

dispersing an aluminum oxide powder in water to form a slurry;

combining the slurry with water to form a first combination;

adding a first amount of a chelating agent to the first combination to form a second combination;

adding a first amount of a surfactant to the second combination to form a third combination;

adding one of the group selected from propylene glycol and ethylene glycol to the third combination to form a fourth combination;

adding a second amount of the chelating agent to the fourth combination to form a fifth combination;

adding a second amount of the surfactant to the fifth combination to form a sixth combination; and mixing the sixth combination to form the heat transfer fluid, wherein the chelating agent comprises a sodium salt solution of polyamino-polyether-methylene-phosphonic acid, wherein the surfactant comprises ammonium salt polyacrylate, and wherein the first amount of the chelating agent is greater than the second amount of the chelating agent.

20. The method recited in claim 19, wherein the first amount of the surfactant is greater than the second amount of the surfactant.

21. The method recited in claim 19, wherein the first amount of the chelating agent is about 1.5 times to about 2.5 times greater than the second amount of the chelating agent.

22. The method recited in claim 19, wherein the first amount of the surfactant is about 1.5 times to about 2.5 times greater than the second amount of the surfactant.

23. The method recited in claim 19, wherein:

the first amount of the chelating agent is about 1.5 times to about 2.5 times greater than the second amount of the chelating agent; and the first amount of the surfactant is about 1.5 times to about 2.5 times greater than the second amount of the surfactant.

24. The method recited in claim 19, wherein the first amount of the chelating agent is 2 times greater than the second amount of the chelating agent.

25. The method recited in claim 19, wherein the first amount of the surfactant is 2 times greater than the second amount of the surfactant.

26. The method recited in claim 19, wherein:

the first amount of the chelating agent is 2 times greater than the second amount of the chelating agent; and the first amount of the surfactant is 2 times greater than the second amount of the surfactant.

27. The method recited in claim 19, further comprising milling the fourth combination.

28. The method recited in claim 19, further comprising wet milling the sixth combination before mixing the sixth combination.

29. The method recited in claim 19, wherein the aluminum oxide powder comprises a particle size between about 100 nanometers and about 600 nanometers.

30. The method recited in claim 19, wherein the heat transfer mixture comprises between about 1% by volume and about 20% by volume of the aluminum oxide powder.

31. The method recited in claim 19, wherein the heat transfer mixture comprises between about 0.1% by volume and about 3% by volume of the chelating agent.

32. The method recited in claim 19, wherein the heat transfer mixture comprises between about 0.1% by volume and about 3% by volume of the surfactant.

33. The method recited in claim 19, wherein the heat transfer mixture has a pH greater than 8.5.

34. A method of forming a heat transfer fluid, the method comprising:

dispersing an aluminum oxide powder in water to form a slurry;

combining the slurry with water to form a first combination;

adding a first amount of a chelating agent to the first combination to form a second combination;

adding a first amount of a surfactant to the second combination to form a third combination;

adding one of the group selected from propylene glycol and ethylene glycol to the third combination to form a fourth combination;

milling the fourth combination for about 45 minutes;

adding a second amount of the chelating agent to the fourth combination after milling the fourth combination to form a fifth combination;

adding a second amount of the surfactant to the fifth combination to form a sixth combination;

wet milling the sixth combination; and mixing the sixth combination for about 30 minutes to form the heat transfer fluid after wet milling the sixth combination, wherein the chelating agent comprises a sodium salt solution of polyamino-polyether-methylene-phosphonic acid, and wherein the surfactant comprises ammonium salt polyacrylate, wherein the first amount of the chelating agent is 2 times greater than the second amount of the chelating agent, wherein the first amount of the surfactant is 2 times greater than the second amount of the surfactant, wherein the aluminum oxide powder comprises a particle size between about 100 nanometers and about 600 nanometers, wherein the heat transfer mixture comprises between about 1% by volume and about 20% by volume of the aluminum oxide powder, wherein the heat transfer mixture comprises between about 0.1% by volume and about 3% by volume of the chelating agent, wherein the heat transfer mixture comprises between about 0.1% by volume and about 3% by volume of the surfactant, wherein the heat transfer mixture has a pH greater than 8.5, and wherein the heat transfer mixture is free of carbon nanoparticles.

* * * * *